United States Patent [19]

Goldberger et al.

[11] 4,182,498

[45] Jan. 8, 1980

[54] RECOVERY OF ROUND METAL GRANULES FROM PROCESS SLUDGE

[75] Inventors: William M. Goldberger; Bhupendra K. Parekh, both of Columbus, Ohio; Bobby P. Faulkner, New Berlin, Wis.

[73] Assignee: The Dow Chemical Company, Midland, Mich.

[21] Appl. No.: 936,979

[22] Filed: Aug. 25, 1978

[51] Int. Cl.$^2$ .................................................. B02C 23/00
[52] U.S. Cl. ........................................ 241/24; 241/29; 241/76
[58] Field of Search .................... 241/24, 29, 76, 77, 241/152 A, 152 R, 14, 30, 78

[56] References Cited

U.S. PATENT DOCUMENTS 1,976,974   10/1934   Whiteside ................................ 209/6

Primary Examiner—Richard B. Lazarus
Attorney, Agent, or Firm—W. J. Lee

[57] ABSTRACT

Metal beads, e.g., magnesium beads, or Mg alloy beads, having a high degree of rotundity, and having a thin coating of sludge or slag ingredients, are recovered from entrapment in a friable contiguous material of sludge or slag material by (a) a primary milling of the friable matrix in a hammer mill or impact mill, (b) screening the material to collect the desired particle sizes, (c) attriting the material in a secondary milling operation to further, and gently, grind sludge material from around the beads, and (d) separating the rotund beads from the pulverized matrix material by using a shape-classifier, such as a slanted shaker table. The material may be treated beforehand by melting the metal-containing sludge or slag, adding a flux or emulsifier material with stirring to cause dispersion of the metal into a relatively narrow particle size range and then freezing the molten mixture. The invention is especially useful in the case of Mg beads, since Mg beads are malleable and pyrophoric.

14 Claims, No Drawings

RECOVERY OF ROUND METAL GRANULES FROM PROCESS SLUDGE

BACKGROUND OF THE INVENTION

The use of various grinding or pulverizing machines for reducing the particle size of various solid materials, such as rocks, ores and minerals, is well known. The use of screens or nests of screens to separate particles into various ranges of sizes is also well known. Very often the screens are vibrated to effect better, faster separations.

The separation of rotund beads from irregular shaped particles on a slanted surface is taught, e.g., in French Pat. No. 730,215; U.S. Pat. Nos. 1,976,974; 2,778,498; 2,658,616; and 3,464,550. A U.S. Department of Interior, Bureau of Mines publication R.I. 4286 dated May, 1948 on "New Dry Concentrating Equipment" contains information on a vibrating-deck mineral shape separator; the separator disclosed is a vibrated tilted table where trajectory of particles across the surface is dependent on the shape of the particles. There are various sludges and slags from mining and metallurgical operations which are known to contain inclusions of metal droplets, such as copper, nickel, tin, and others.

U.S. Pat. No. 3,037,711 teaches the use of beater mills or hammer mills for pulverizing dross from metal particles, then separating the fines from the particles by suction.

General information about pulverizers, screens, and tabling may be found in, e.g., "Chemical Engineers Handbook" by Robt. H. Perry, Editor, published by McGraw-Hill.

The separation of solid Mg metal spheroids from entrapment in a solid contiguous matrix of a friable salt or mixture of salts presents particular problems to an investigator who may desire to recover the Mg in its spheroidal form and also retain on each spheroid a thin protective coating of the matrix material. Whereas it has been known for many years that such a Mg-containing matrix is removed as cell sludge from the electrolysis of molten $MgCl_2$ and as a slag material from Mg or Mg-alloy casting operations, attempts to recover the Mg or Mg alloy particles by grinding or intensive ball-milling have generally resulted in smashing, breaking, or flattening a large portion of the Mg particles. Such deformed particles may be acceptable if the primary purpose of recovering the Mg metal is that of re-melting the Mg for coalescence or for re-casting.

In the present invention, however, what is of special interest is the recovery, from the solid matrix, of Mg spheroids which each have a thin protective coating of the matrix remaining thereon. Such spheroidal Mg particles are of particular interest for use in inoculating molten ferrous metals, e.g., the desulfurization of steel. The thin protective coating of matrix on the Mg spheroids helps avoid the hydrolysis of Mg by moisture or the oxidation of Mg by air. Mg particles which are substantially flattened or elongated or which do not have a high degree of rotundity are not as readily useful in operations where the particles are injected through a lance beneath the surface of molten iron or steel. Ideally, the operators of such lances would prefer that the Mg particles be of consistent size, consistent Mg content, and consistent rotundity in order to avoid unwelcome variances during the inoculation process.

U.S. Pat. No. 3,881,913 and U.S. Pat. No. 3,969,104 disclose the preparation of salt-coated Mg granules by an atomization technique and also disclose that such granules are useful for injection into molten iron through a lance.

The salt-coated Mg particles of interest in the present invention may be called "powders", "beads", "pellets", "granules" or other such term. The particles of greatest interest have a high degree of rotundity, being of a spherical and/or oval shape, and have a particle size in the range of about 8 mesh to about 100 mesh (U.S. Standard Sieve size). For the common practice of inoculating ferrous melts through a lance, the preferred particle size is generally within the range of about 10 mesh to about 65 mesh.

Various patents have described the molten salt mixtures, containing $MgCl_2$, which may be employed in electrolytic cells for the electrolytic production of Mg metal, e.g., U.S. Pat. Nos. 2,888,389, 2,950,236, and 3,565,917. It is disclosed that the composition of the salt mixture may be varied in order to adjust the density to be greater than, or less than, molten Mg metal. Sludges formed in such electrolytic Mg processes are known to contain Mg metal particles entrapped in a matrix of salt, and, usually there are some Mg oxide values also present, due to contact with air or moisture. The use of fluorides in the salt mixtures as coalescing agents for the Mg metal is disclosed.

At the 6th SDCE International die casting congress, organized by The Society of Die Casting Engineers, Inc. at Cleveland, Ohio on Nov. 16–19, 1970 there was a paper (Paper No. 101) on "Factors Controlling Melt Loss in Magnesium Die Casting", authored by J. N. Reding and S. C. Erickson. The paper discloses the entrapment of Mg particles and Mg alloy particles in sludges and slags, and discloses studies about coalescing agents and dispersion agents (emulsifiers) for the Mg particles. It also discloses the grinding, in a ball mill, of a Mg-containing sludge to recover the Mg particles from entrapment therein.

Therefore, sludge material from Mg-producing processes, or from Mg-casting operations are known to contain Mg metal entrapped therein. In the Mg-producing processes, e.g., the electrolyzing of molten $MgCl_2$ in the presence of other molten salts to produce $Cl_2$ and molten Mg, the sludge material is composed of metal salts, oxides, impurities, and contaminants and contains a relatively small amount of Mg particles of various sizes dispersed therein.

In Mg-casting, or Mg-alloy casting, a melt flux is usually provided on the surface of the molten metal in the melting vessel to prevent or retard contact of the metal with air or moisture and to prevent Mg fires. Such fluxes are usually mixtures of molten salts such as disclosed in U.S. Pat. No. 2,327,153 which also discloses that small Mg beads become trapped in the frozen sludge or slag as discrete fine globules having a diameter as small as 0.01 inch. The patent also discloses the invention of re-melting and stirring the sludge or slag in order to get the small Mg beads to coalesce into large beads of about 0.5 inch or large diameter, then partly cooling and separating the frozen beads from the still-molten salts by filtration.

Thus, the metal salt compositions of Mg cell sludges, Mg-casting slags, and Mg alloy-casting slags are a matter of record and are seen to comprise various mixtures and ratios of alkaline metals salts, alkaline earth metal salts, some oxides and, generally, some impurities and contaminants.

It is an object of the present invention to recover rotund metal particles, Mg particles, or Mg alloy particles, from entrapment in a contiguous, friable matrix of sludge or slag material.

A further object is to recover such rotund particles by a process which substantially avoids flattening, rupturing, or pulverizing said particles.

Another object is to recover such Mg beads in a manner that the Mg particles retain a thin protective coating of the sludge material in which they were entrapped.

Yet another object is to recover coated Mg particles having a relatively consistent Mg content and relatively consistent particle size range and rotundity for use as an inoculant through a lance into a molten ferrous metal.

These, and other beneficial objects apparent to practitioners of the relevant arts, are substantially attained by the presently disclosed invention.

SUMMARY OF THE INVENTION

Metal beads, especially Mg or Mg alloy beads, having a high degree of rotundity, and having a thin protective coating of sludge (or slag) ingredients, are recovered from entrapment in a friable, contiguous matrix of sludge (or slag) material by (a) pulverizing the friable matrix in a hammer mill or impact mill, (b) screening the material to collect the desired particle sizes, (c) attriting the material in a secondary milling operation to further, and gently, grind sludge material from around the beads, and (d) separating the rotund beads from the pulverized matrix material by using a shape classifier. Preferably, a Mg-containing contiguous matrix is treated beforehand by melting the material, adding a flux or surfactant material with stirring to cause dispersion of the Mg into a relatively narrow particle size range and then freezing the molten mixture, thereby entrapping the Mg particles as rotund, dispersed beads within the matrix, then applying the Mg-bead recovery steps.

DETAILED DESCRIPTIONS

As used herein, the expression "high degree of rotundity" is applied to particles, beads, pellets or granules which are spherical, or at least nearly spherical, but also includes oval shapes which roll easily on a slightly inclined surface. In contradistinction, particles which are substantially broken, smashed, flattened or irregular and which do not roll easily on a slightly inclined surface are not considered as having a high degree of rotundity. As used herein, "rotund" particles refer to metal particles having a "high degree of rotundity".

"Metal particles" refer to particles which contain at least one metal, or alloy, from the group consisting of Mg, Cu, Sn, Al, Pb, Ni, Fe, Zn, Co, Mn, Cr, or Mo.

A "hammer mill" or "impact mill" implies an apparatus which employs a plurality of swinging or revolving hammer blades or projections which strike the material fed in, thereby pulverizing the friable material. For purposes of conciseness, the term "hammer mill" is used herein to include all impact mills which employ the name generally type of impact on the particles as does the hammer mill.

"Mg-containing sludges or slags", sometimes referred to herein as "sludge", includes sludge or slag material from a Mg-producing process, or from a Mg-casting or Mg alloy casting operation, which contains particles of Mg (or Mg alloy) entrapped therein. The material which entraps the Mg particles is a friable, contiguous matrix of a frozen salt mixture which may also, and usually does, contain some oxides, contaminants, and impurities. As used herein, unless the exception is obvious, the expression "Mg" or "magnesium" is meant to include Mg alloys where Mg comprises the majority portion of the alloy. The most commonly known alloys are believed to be those of magnesium alloyed with aluminum or zinc.

In the practice of the present invention it is essential that the Mg particles, which are recovered as the final product and which are intended for use as an inoculant for ferrous metls, have a high degree of rotundity and retain a thin protective coating of the sludge materials. The protective coating helps avoid the problems and dangers of handling, shipping, and storing the finely-divided Mg particles; without a protective coating the Mg particles are subject to rapid oxidation and, in some cases, may become ignited. The Mg particles recovered by the present invention are required to be substantially within the range of about 8 to about 100 mesh, preferably about 10 to about 65 mesh, in order to be acceptable to industries which inject them into molten ferrous metals through a lance.

Quite often sludge material is taken in molten or semi-molten form from the Mg-producing or Mg-casting operations and allowed to cool (freeze) into relatively large pieces. It is necessary to break up such large castings into sizes which are acceptable in the hammer mill; this may be done by the use of sledge hammers or other convenient means.

We have found that the pieces of Mg-containing matrix may be passed through a hammer-mill to break up the friable matrix without causing an appreciable amount of flattening or breaking of the rotund Mg particles, yet the hammer mill leaves a coating of the matrix material on the Mg particles. The material may be passed through the hammer mill a plurality of times, or through a series of two or more hammer mills to assure substantially complete pulverization of matrix agglomerates without completely removing the protective coating on the Mg beads. In contradistinction, attempts to free the Mg particles from the matrix material by passing the material through roll-mills, crusher mills, or ball-mills containing large heavy rolls or bars generally results in smashing or flattening a sizeable portion of the rotund Mg particles.

After treatment in the hammer-mill, the material is screened to remove particles greater than 8 mesh and less than 100 mesh. It is generally desirable to shake the screens to get rid of excess powdery matrix material which may still be clinging to the coated Mg-particles without actually being a part of the contiguous coating. There are a number of commercially available screens, including vibrated screens, which are suitable for use in this invention.

After screening, the recovered Mg particles are given an attrition treatment in a secondary milling operation utilizing relatively gentle grinding such as with a vibrated grinder mill containing ceramic cylinders, balls, bars, or pellets, in order to further reduce the amount of excess matrix material on the Mg particles, yet not completely remove the thin protective coating nor destroy the rotundity of the Mg particles.

Following the secondary milling operation, the material may be screened again to remove the fines which pass through a 100 mesh screen. The Mg particles from the secondary milling operation, or from the screening following such milling, are shape-classified, e.g., by being fed to the highest portion of a slanted shaker table. The rotund particles roll easier than the non-rotund particles, thus take a different trajectory than the non-rotund particles and fall off the table into a different collection vessel.

In those instances where the salt-mixture comprising the matrix material is hygroscopic, it is preferred that a relatively dry (less than about 35% relative humidity) atmosphere be provided during the process. This is especially important in the screening and tabling steps because moisture-dampened particles tend to cling to surfaces which they contact and interfere with classification of the particles. Also, if the product is to be used for molten ferrous metal inoculations it is important that the particles be substantially dry and free-flowing.

As disclosed supra, it is preferable in some cases to re-melt the Mg-containing sludge before-hand in order to add a dispersion agent or emulsifier, with stirring, to cause the majority of the Mg particles to be within a narrow particle size range, preferably within the range of 10 mesh to about 65 mesh. The need for such an emulsifier is apparently dependant to some extent to the amount of coalescents, e.g., calcium fluoride, which are present in the sludge. If on inspection and analysis, it is seen that there are relatively large particles of Mg which would be retained on a 10-mesh screen, the need for re-melting and dispersing the Mg into finer particles is indicated and for this an emulsifier or dispersing agent is beneficial. On the other hand, initial tests or inspection may indicate that there is no need to redisperse the Mg particles prior to breaking them free in the hammer-mill.

Re-melting operations are also useful in the event that there are available some non-rotund Mg particles which may be among the fines from the screening operations or from elsewhere. By re-melting sludge materials and various Mg scrap materials, using emulsifiers and stirring, one may produce a frozen matrix containing entrapped Mg particles in a given range of sizes which may be recovered according to the present invention for use as an inoculant for molten ferrous metals.

The following experimental work describes the metal particles of special interest, viz. Mg particles, yet the recovery process described is applicable to other metal particles entrapped in a friable matrix, even though the other metals may not have the same degree of malleability and oxidation rate as Mg.

EXPERIMENTAL

Preliminary studies were made to ascertain the effect of various pieces of equipment for the milling operations to liberate Mg particles from sludge without substantially altering the spherical shape of the Mg inclusions.

PRIMARY MILLING

Pieces of sludge of about 6–8 inches in size were processed through a roller mill, a jaw crusher, and a hammer-mill. The roller mill produced a ground product which had a significant amount of the Mg particles deformed into flat or elongated shapes. The jaw crusher produced fewer flattened Mg particles. The hammer mill produced very little deformation of the Mg particles. It appears that the good results in the hammer-mill may be due to the short retention time in the mill, with the impact force being dependent on the size of the particle being struck. Thus, for the small Mg particles, the impact is not sufficient to cause deformation.

SECONDARY MILLING

Secondary milling involves gently grinding the fine-size sludge to further liberate the Mg particles from most of the salts and to remove loosely-bound salt from the coated Mg particles. This step must be done in a manner that retains the spherical shape of the metal particles. Tests were made in (1.) a steel ball mill, (2) a pebble mill, (3) a roll crusher, (4) a hammer mill, (5) a disc pulverizer, and (6) a vibrating grinding mill. Product from the tests were analyzed and it was found that the steel ball mill, the roll crusher, and the disc pulverizer caused substantial deformation of the Mg into flat shaped particles. Product from the pebble mill, hammer mill and vibrating grinding mill showed little or no deformation of the Mg particles. Improvement in the steel ball mill results were made by replacing the steel balls with the lighter ceramic-type pebbles, e.g., quartz or alumina pebbles. Thus, it is apparent that the milling must be gentle, not vigorous. The expression "gentle milling" is used here to describe a milling which will break up the friable salt aggregates, yet not substantially deform the Mg particles nor completely remove the thin salt coating adhered to the surface of the Mg particles. It appears that the thin salt-coating directly attached to the Mg particles is of greater physical integrity than the rest of the friable salt matrix which is not in direct contact with the Mg. Thus, it is possible, according to the present invention to gently grind the friable matrix away from the salt-coated or matrix-coated Mg particle without removing the Mg coating, but must be done in such a manner that the impact on the Mg particle is not great enough to smash it.

Having found an operable means for liberating coated, rotund Mg particles from entrapment in the friable matrix, we applied these findings in preparing a product suitable as an inoculant in a molten ferrous metal.

In the following examples magnesium assays were conducted by reacting a known weight of the sample with an excess of 1 N HCl and measuring the volume of hydrogen evolved. The magnesium metal content was calculated based on the reaction:

$$Mg + 2HCl \rightarrow MgCl_2 + H_2$$

In the following examples, a mesh size shown as a single number means that the material was retained on that screen size; two numbers shown, e.g., as 20×28 means that the material passed through a 20 mesh screen and was retained on a 28 mesh screen. The expression 100×0 means the material passed through a 100 mesh and was caught in the pan. Unless noted otherwise, the screen mesh sizes are U.S. Standard Sieve Size.

EXAMPLE 1

A 4-ton sample of sludge from an electrolytic Mg cell was fed (as 6–8 inch chunks) through a Jeffrey Hammer Mill, Model 30AB, manufactured by the Jeffrey Manufacturing Company of Columbus, Ohio. This mill was equipped with swing-type hammers. The size content of the discharge could be controlled by installing screens of desired openings. The capacity of the mill with the screen discharge set at a 1-inch opening was about 12 tons per hour.

A representative sampling was screen analyzed and assayed and the distribution of Mg metal in the sample was as follows in Table I:

TABLE I

| Mesh Size | Weight gms. | Weight % | Cumulative Weight % | Mg Assay % | Mg Dist. % |
|---|---|---|---|---|---|
| 4 | 2.2 | 1.0 | 1.0 | 55.0 | 2.5 |
| 4 × 10 | 47.9 | 20.0 | 21.0 | 35.0 | 32.7 |
| 10 × 14 | 17.2 | 7.0 | 28.0 | 20.0 | 6.5 |
| 14 × 20 | 19.0 | 8.0 | 36.0 | 35.0 | 13.1 |
| 20 × 28 | 18.4 | 8.0 | 44.0 | 40.0 | 15.0 |
| 28 × 35 | 18.0 | 7.0 | 51.0 | 38.0 | 12.4 |
| 35 × 48 | 17.1 | 7.0 | 58.0 | 30.0 | 9.8 |
| 48 × 65 | 14.9 | 6.0 | 64.0 | 16.0 | 4.5 |
| 65 × 100 | 15.3 | 6.0 | 70.0 | 4.0 | 1.1 |
| 100 × 0 | 74.0 | 30.0 | 100.0 | 1.5 | 2.4 |

One thousand pounds of the Jeffrey Hammer Mill product was classified at ½ inch (1.27 cm) and ¼ inch (0.63 cm) inch size. The minus ¼ inch material was then classified at 10, 35, and 65 mesh sizes. Size distribution data and Mg assay for each size fraction are shown below in Table II.

TABLE II

| Size | Weight, lb. | Weight, % | Cumulative Weight % | Assay % | Dist. % |
|---|---|---|---|---|---|
| ½" | 1.0 | 0.1 | 0.1 | 99.0 | 0.66 |
| ½" × ¼" | 34.0 | 3.5 | 3.6 | 48.7 | 11.36 |
| ¼" × 35 mesh | 508.7 | 52.1 | 55.7 | 21.0 | 72.93 |
| 35 × 65 mesh | 182.0 | 18.6 | 74.3 | 10.0 | 12.40 |
| 65 × 0 mesh | 250.0 | 25.7 | 100.0 | 1.54 | 2.65 |

The data indicate that approximately 25 percent of the total ground material was 65×0 mesh and contained only 1.54 percent Mg metal by analysis. This represented only 2.65 percent of the total Mg present in the sludge. The minus 65 mesh fraction was therefore not processed further in this experiment.

The ½-inch material consisted of a large size metal and further grinding was not done; it was not within the size range desired for inoculation through a lance, but it does represent a significant recovery of Mg metal from the sludge and is suitable for remelting operations. The ½-inch×¼-inch material was re-ground in a portable laboratory hammer mill fitted with 1-inch screen openings. The lab hammer mill was a Fitz Mill, Model M, manufactured by the W. J. Fitzpatrick Company, Chicago, Ill. The capacity of the mill, with 1-inch screens, was about 250 lb./hr. when fed with ½-inch size sludge. Re-screening at ¼-inch, it was found that 81.6% product passed through (Mg assay 20.2%) and 18.4% was retained on the ¼-inch screen (Mg assay 90.5%). The ¼-inch material was suitable for re-melting operations, but was of a larger size than is ordinarily desired for inoculations through a lance.

Five hundred pounds of the ¼-inch×35 mesh material was given a secondary milling in a Sweco Vibro-energy grinding mill, Model DM 3, manufactured by Sweco, Inc., Los Angeles, Calif. The mill angle was set at 30 degrees, which gave satisfactory results, after it was tried at 15 degrees without satisfactory results. The material was ground continuously using alumina cylinders of two sizes, 1¼-inch D×1¼-inch and 13/16-inch D×13/16-inch, as grinding media. The mill is equipped with a dust cover which minimizes the escape of dust.

The ground material was classified at 10, 35, and 65 mesh using an 18-inch Sweco Vibro-energy three-deck separator. The Sweco separator was equipped with a self-cleaning kit for each screen and was a covered unit to provide minimum exposure of the sludge material to the atmosphere. Dust covers were used at feed and discharge to minimize escape of dust. The size distribution and Mg assay for the various sizes are shown below in Table III.

TABLE III

| Mesh Size | Weight lb. | Weight % | Cumulative wt. % | Mg Assay % |
|---|---|---|---|---|
| 10 | 84.5 | 16.86 | 16.86 | 33.8 |
| 10 × 35 | 217.5 | 43.40 | 60.26 | 35.4 |
| 35 × 65 | 95.7 | 19.10 | 79.36 | 10.8 |
| 65 × 0 | 103.5 | 20.64 | 100.00 | 1.8 |

The plus 10-mesh material was further ground in the laboratory hammer-mill fitted with ½-inch screen openings. The ground material was classified at 10 mesh. The minus 10-mesh material was classified to recover additional 10×35, 35×65, and 65×0 mesh size fractions.

The total amount of the 10×35 mesh size material was subjected to shape classification using a shaking table manufactured by Diester Concentrator Company, Inc., Fort Wayne, Ind. The shaker table was modified by placing a smooth sheet of aluminum on the riffled surface of the table. The concentrate was found to be salt-coated, rotund Mg beads; the middling was a mixture of Mg beads, small particles of unground sludge containing very small metal inclusions, and metal-free salt; the tailings appeared to be mainly metal-free salt with some very fine Mg metal inclusions. The tabling data is shown in Table IV.

TABLE IV

| Product | Weight lb. | Weight % | Mg Assay % | Mg dist. % |
|---|---|---|---|---|
| Concentrate | 81.0 | 31.1 | 85.4 | 74.6 |
| Middlings | 45.0 | 17.3 | 25.6 | 12.4 |
| Trailings | 134.0 | 51.6 | 8.9 | 13.0 |

The concentrate is of a size and content to be acceptable as a lance-fed inoculant for molten ferrous metals. The middlings and tailings are not considered as desirable for use as an inoculant, though they may be recycled for re-melting operations, especially where additional Mg metal is added for the purpose of creating dispersed Mg beads in a friable matrix.

An attempt to shape-classify the 35×65 mesh on the shaker table was thwarted by the fact that the material, being hygroscopic, became contaminated with enough atmospheric moisture to become moist and had a tendency to adhere to the table, even though the table was slanted several degrees from horizontal.

Studies made on the moisture pick-up problem indicated that when hygroscopic materials are to be screened or tabled for classification, they must be protected by employing an environment for them which is controlled at about 35% relative humidity or less.

EXAMPLE 2

Approximately one thousand pounds of the Mg cell-sludge material as used in Example 1 was ground in the large hammer mill and classified at ½-inch, 4, 10, 20, and 48 mesh size. The ½-inch×4-mesh, and the 4×10-mesh fractions were reground on the laboratory hammer mill fitted with 1-inch and ½-inch screens, respectively. The ground material was again classified at 4 and 10 mesh. The amounts and assays of the various fractions are shown in Table V.

TABLE V

| Size | Wt. lbs. | Wt. % | Cumulative Wt., % | Mg Assay % | Dist. Mg. % |
|---|---|---|---|---|---|
| ½ inch | 2.5 | 0.25 | 0.25 | 80.6 | 1.8 |
| ½ inch × ¼ inch | 5.8* | 0.59 | 0.84 | 85.4 | 4.6 |
| ¼ inch × 10 mesh | 22.8* | 2.35 | 3.19 | 63.1 | 13.6 |
| 10 × 20 | 65.0 | 6.71 | 9.90 | 21.0 | 12.9 |
| 20 × 48 | 212.25 | 21.91 | 31.81 | 22.5 | 45.1 |
| 48 × 0 | 660.35 | 68.19 | 100.00 | 3.5 | 22.0 |

*Wt. obtained after the material was ground in the hammer mill and screened to remove 10 × 20, 20 × 48, and 48 × 0 mesh size fractions.

The 10×20 and 20×48 mesh fractions were given a secondary milling in the Sweco grinding mill at a rate of approx. 3 lbs./hr. The ground materials were classified with the Sweco separator to recover 10×20, 20×48, and 48×0 mesh size material. The feed rate to the 18-inch Sweco separator was approx. 4 lbs./min.

The 10×20 and 30×48 mesh fractions from the secondary milling were fed separately to the slanted shaker table for shape classification. The data from the table classification (feed rate of 75 lbs./hr.) of the 10×20 mesh fraction are shown in Table VI.

TABLE VI

| Product | Wt., lb. | Wt., % | Mg Assay, % |
|---|---|---|---|
| Concentrate | 27.3 | 42.0 | 90.2 |
| Middling | 10.4 | 16.0 | 21.0 |
| Tailings | 27.3 | 42.0 | 16.9 |

The data from the table classification (feed rate of 26 lbs./hr.) of the 20×48 mesh fraction are shown in Table VII.

TABLE VII

| Product | Wt., lb. | Wt., % | Mg Assay, % |
|---|---|---|---|
| concentrate | 56.25 | 26.5 | 93.8 |
| middling | 37.10 | 17.5 | 25.7 |
| tailings | 118.65 | 56.0 | 8.0 |

It was determined that the middling fractions from the above once-tabled products could be re-tabled to recover additional salt-coated Mg beads (as concentrate) having a Mg content of from about 75% to about 86%.

EXAMPLE 3

From the previous experimentations, it became apparent that moisture pick-up problems were greater with the minus 35 mesh material than with the larger particles. It was also concluded that longer grinding times, especially the secondary milling operations, were needed to improve the recovery and grade of the most desired final product.

About 3200 pounds of the cell sludge material, after being processed through the large hammer mill were classified and analyzed as shown in Table VIII.

TABLE VIII

| Size | Wt., lb. | Wt., % | Cum. Wt., % | Mg Assay % | Dist. Mg, % |
|---|---|---|---|---|---|
| +½" | 6.5 | 0.2 | 0.2 | 90.0 | 1.4 |
| ½" × 4 mesh | 120.0 | 3.8 | 4.0 | 48.5 | 14.7 |
| 4 × 10 mesh | 443.0 | 14.0 | 18.0 | 10.8 | 12.1 |
| 10 × 20 mesh | 490.5 | 15.5 | 33.5 | 21.0 | 25.9 |
| 20 × 48 mesh | 870.0 | 27.5 | 61.0 | 10.5 | 36.2 |
| 48 × 0 mesh | 1234.0 | 39.0 | 100.0 | 3.1 | 9.7 |

The ½"×4-mesh and the 4×10 mesh fractions were re-ground in the laboratory hammer mill fitted with 1" and ¼" screens, respectively. The ground sludge material was then classified at 4, 10, 20, and 48 mesh. The 10×20 and the 20×48 mesh fractions were combined with the material from the same size fractions obtained initially.

The 10×20 and the 20×48 mesh fractions were given secondary grinding in batches. The purpose of these batch grinding tests was to evaluate the effect of grinding time in the Sweco grinding mill.

Batches of 10×20 mesh fractions (50-lb. batches) were ground for various lengths of time in the Sweco grinding mill using 250 lbs. of the 1⅙" alumina cylinders as grinding media in some tests and using 250 lbs. of 13/16" alumina cylinders in the other tests. For each retention time, the ground material was screened at 20 and 48 mesh to determine wt.% of each size product obtained. The data are shown in Table IX.

TABLE IX

| Retention Time (min) | Mesh Size | Grinding Media* a or b | Wt., % | Cum. Wt., % | Mg Assay, % |
|---|---|---|---|---|---|
| 5 | 10 × 20 | a | 25.7 | 25.7 | 41.9 |
|   |   | b | 39.4 | 39.4 | 32.3 |
| 5 | 20 × 48 | a | 39.5 | 65.4 | 21.0 |
|   |   | b | 33.7 | 73.1 | 15.4 |
| 5 | 48 × 0 | a | 34.6 | 100.0 | 2.6 |
|   |   | b | 26.9 | 100.0 | 2.07 |
| 10 | 10 × 20 | a | 20.6 | 20.6 | 44.30 |
|   |   | b | 26.5 | 26.5 | 26.70 |
| 10 | 20 × 48 | a | 38.2 | 58.8 | 14.80 |
|   |   | b | 36.4 | 62.9 | 18.30 |
| 10 | 48 × 0 | a | 41.2 | 100.0 | 2.38 |
|   |   | b | 37.1 | 100.0 | 2.07 |
| 20 | 10 20 | a | 14.8 | 14.8 | 48.3 |
|   |   | b | 27.2 | 27.2 | 46.7 |
| 20 | 20 × 48 | a | 33.5 | 48.3 | 20.4 |
|   |   | b | 30.5 | 57.7 | 27.8 |
| 20 | 48 × 0 | a | 51.7 | 100.0 | 3.0 |
|   |   | b | 42.3 | 100.0 | 2.13 |
| 30 | 10 × 20 | a | 21.25 | 21.25 | 48.8 |
|   |   | b | 24.80 | 24.80 | 45.1 |
| 30 | 20 × 48 | a | 25.50 | 46.75 | 21.20 |
|   |   | b | 26.10 | 50.90 | 28.80 |
| 30 | 48 × 0 | a | 53.25 | 100.0 | 3.10 |
|   |   | b | 49.10 | 100.0 | 2.28 |

*a — 1 1/6 inch alumina cylinders.
b — 13/16 inch alumina cylinders.

Based on the amount of 48×0 mesh size produced by the grinding, a retention time of at least about 15–20 min. is preferred, regardless of which size alumina grinding media is used. Some additional grinding is achieved at 30 min., but beyond that additional grinding offers little improvement to offset the expense of such additional grinding. The preferred range, then is about 15 to about 30 minutes, most preferably about 20–25 minutes.

EXAMPLE 4

A sample of sludge was re-melted in order to add a flux to cause re-dispersion of the Mg into small beads of a more uniformly small size in order to avoid having large particles of Mg in the frozen salt matrix.

The sludge sample was obtained from a Mg casting operation. It comprised the frozen salt mixture containing Mg particles of wide range of sizes, ranging mostly from about 3.5 mm. in diameter down to less than about 0.1 mm. The majority of the Mg appeared, by study of a 4× photomicrograph, to be in particles of about 2 mm or greater. Many of the particles were irregular shape.

Though the sludge is processable by the methods described in the preceding examples, to recover salt-coated Mg pellets therefrom, the majority of such pellets would not fall within the consistent narrow range desired for inoculating molten ferrous melts through a lance.

It was found that by adding to a 25-lb. melt of the sludge, a 5-lb. portion of flux, and stirring it for 5 minutes, and then cooling a sample of it, the frozen flux matrix contained a better, more uniform dispersion of the Mg beads and the degree of rotundity was also improved. Only a small percent of the particles were as large as 1 mm. The melt was at 1400° F. (760° C.) and the added flux was composed of about 8–11% $BaCl_2$, about 2–5% $CaF_2$, about 31–37% $MgCl_2$, 0–4% MgO and at least 43% KCl.

To the remaining sludge melt (minus the above sample pulled for analysis) there was added 0.5 lb. of lampblack (an emulsifier). The lampblack was added to the vortex caused by the stirrer to assure rapid dispersion within the melt. After 10 minutes of stirring, a sample was taken and cooled. Study of a 4× photomicrograph of the cooled sample indicated that the Mg beads were nearly all of a particle size within the range of about 0.4 mm down to about 0.044 mm. It appeared from the visual study that most of the Mg metal was present in rotund beads within the range of about 0.15 to about 0.4 mm. Only a small percent of the Mg metal was in sizes smaller than about 0.15 mm. Beads of this size, when freed from entrapment in the salt matrix according to the presently disclosed method, and being salt-coated, nearly all fall within the range of about 20×65 mesh.

The foregoing examples are to illustrate embodiments of the invention and not to limit it, the invention being limited only by the claims that follow.

We claim:

1. A method of separating dispersed rotund beads of metal, metal alloy, Mg, or Mg alloy from entrapment in a frozen, contiguous, friable matrix, said process comprising feeding to a hammer mill the said friable maxrix containing dispersed, rotund beads of metal, metal alloy, Mg or Mg alloy thereby breaking up the matrix and releasing the entrapped beads of metal, the so-released beads of metal being characterized by a relatively-thin coating of the matrix remaining thereon and substantially retaining their rotundity, screening the material from the hammer mill to collect the fraction which passes through an 8 mesh screen and is retained on a 100 mesh screen, subjecting the collected fraction to a gentle grinding to further pulverize the matrix agglomerates without destroying the thin matrix coating adhering to each metal bead and without substantially destroying the rotundity of the metal beads, subjecting the so-ground material to a shape classifier whereby the material is classified according to the rotundity of the particles.

2. The method of claim 1 wherein the magnesium alloy is an alloy of magnesium with aluminum or zinc.

3. The method of claim 1 wherein the shape classifier is a slanted shaker table having a smooth table surface.

4. The method of claim 1 wherein the gentle grinding is performed in a ball mill containing ceramic-type grinding media, in a pebble mill, in a hammer mill, or in a vibrating grinding mill.

5. The method of claim 1 wherein the friable matrix comprises at least one metal compound selected from the group consisting of inorganic salts of alkali metal or alkaline earth metals.

6. The method of claim 1 wherein the friable matrix comprises $MgCl_2$ in admixture with at least one compound selected from the group consisting of NaCl, LiCl, $CaF_2$, KCl, and MgO.

7. The method of claim 1 wherein the friable matrix comprises an electrolyte composition from which molten Mg metal is produceable by electrolysis of the said electrolyte in molten form.

8. The method of claim 1 wherein the friable matrix, containing dispersed beads of Mg metal or Mg alloy metal, is the frozen sludge recovered from the fused salt electrolysis of a mixture of $MgCl_2$, LiCl, NaCl, and CaF during which electrolysis molten Mg is produced.

9. The method of claim 1 wherein the friable matrix, containing dispersed beads of Mg metal or Mg alloy metal, is the slag produced in casting operations of said Mg metal or Mg alloy metal.

10. The method of claim 1 wherein the friable matrix, containing dispersed beads of Mg metal or Mg alloy metal, is prepared beforehand by melting the material and adding to the melt, with stirring, an emulsifier which causes the molten metal to form small globules within the melt, and then freezing the material to trap the metal globules as small beads within the frozen matrix.

11. The method of claim 1 wherein the ground material from the gentle grinding step is screened, to remove particles which pass through a 65 mesh screen, prior to being subjected to shape classification.

12. The method of claim 1 wherein the grinding, screening, and classifying is performed under conditions such that the material being processed is protected against substantial contact with atmosphere of greater than about 35 percent relative humidity.

13. The method of claim 1 wherein the gentle grinding is done for a period of time of at least about 15 minutes.

14. The method of claim 13 wherein the gentle grinding step is done for a period of time within the range of about 15 minutes to about 30 minutes.

* * * * *

UNITED STATES PATENT AND TRADEMARK OFFICE
CERTIFICATE OF CORRECTION

PATENT NO. : 4,182,498

DATED : January 8, 1980

INVENTOR(S) : William M. Goldberger, Bhupendra K. Parekh, and Bobby P. Faulkner

It is certified that error appears in the above-identified patent and that said Letters Patent are hereby corrected as shown below:

Column 4, line12, correct "metls" to read --melts--.

Column 8, line 38, Table IV, correct the word "Trailings" to read --Tailings--.

Column 9, line 19, correct "30x48" to read --20X48--.

Column 10, line 33, Table IX, correct "10 20" to read --10 X 20--.

Column 11, line 42, correct the word "maxrix" to read --matrix--.

*Signed and Sealed this*

*Twenty-seventh* Day of *May 1980*

[SEAL]

Attest:

SIDNEY A. DIAMOND

*Attesting Officer*     *Commissioner of Patents and Trademarks*